United States Patent [19]
Kinney et al.

[11] 3,927,785
[45] Dec. 23, 1975

[54] ELECTRICAL WIRING BOX STRUCTURE

[75] Inventors: David W. Kinney, Parkersburg; William E. Baxter, Walker, both of W. Va.

[73] Assignee: Union Insulating Company, Parkersburg, W. Va.

[22] Filed: Oct. 24, 1974

[21] Appl. No.: 517,622

[52] U.S. Cl. ................................. 220/3.8; 174/53
[51] Int. Cl.[2] ......................................... H02G 3/08
[58] Field of Search ............... 220/3.8, 3.2, 3.3, 3.5; 174/53

[56] References Cited
UNITED STATES PATENTS

| | | | |
|---|---|---|---|
| 1,869,646 | 8/1932 | Anderson | 220/3.8 |
| 3,740,451 | 6/1973 | Schindler et al. | 220/3.2 X |
| 3,770,873 | 11/1973 | Brown | 174/53 X |
| 3,863,037 | 1/1975 | Schindler et al. | 220/3.9 X |
| 3,891,113 | 6/1975 | Salg | 220/3.6 |
| R28,489 | 7/1975 | Schindler et al. | 220/3.9 X |

*Primary Examiner*—William I. Price
*Assistant Examiner*—Steven M. Pollard
*Attorney, Agent, or Firm*—Peter Xiarhos; Elmer J. Nealon; Norman J. O'Malley

[57] ABSTRACT

An electrical wiring box structure. The electrical wiring box structure includes a first, main body portion for receiving an electrical device and a second, lateral portion extending from, and in open communication with, the first portion for increasing the volume of the first portion to permit the reception in the second portion of wires or other parts associated with or used in conjunction with the electrical device. The first and second portions are offset with respect to each other and have offset openings defined therein by a plurality of walls. In accordance with the present invention, the opening of the second portion of the electrical wiring box structure is covered by a snap-fitting cover or lid. The electrical wiring box structure is arranged to be inserted into an opening provided in a flat wall structure with the opening in the first portion being aligned with the opening in the wall structure and with the covered second portion being disposed behind the wall structure adjacent to the opening in the wall structure.

16 Claims, 9 Drawing Figures

ELECTRICAL WIRING BOX STRUCTURE

BACKGROUND OF THE INVENTION

The present invention relates to an electrical wiring box structure and, more particularly, to an electrical wiring box structure particularly suitable for use in wiring systems in buildings, mobile homes, modular constructions and the like.

A number of electrical wiring box structures of different types useful in various kinds of building structures are presently well known to those skilled in the art. One common type of electrical wiring box structure, used principally in the wiring systems of building structures having limited depth of wall space (e.g., mobile homes and modular constructions), and with which the present invention is particularly concerned, includes a first portion having an opening therein for receiving an electrical device such as a switch or outlet, and a second, lateral portion extending from and in open communication with the first portion for increasing the internal volume of the first portion. The second portion provides space for the reception of wires and other parts associated with or used in conjunction with the electrical device contained in the first portion and is generally necessary to satisfy code requirements which specify a particular relationship between the space or volume within a box structure and the number and type of electrical connections or wires to be housed therein in order to minimize fire hazards. In the installation of a wiring box structure of the above type, the wiring box structure is inserted into an opening provided in a flat wall structure such as wallboard or panelling so that the opening of the first portion of the box structure is aligned with the opening in the wall structure and the second portion is disposed behind the wall structure laterally of the opening in the wall structure.

The construction of wiring box structures of the above type may take different forms. In one construction known to those skilled in the art, and described in detail in U.S. Pat. No. 3,622,029, the first and second portions take the form of separate units with one of the units having an opening therein for receiving an electrical device and the other unit being smaller than the first unit and telescoping within the first unit to provide a lateral extension in open communication with the first unit for increasing the internal volume of the first unit. If desired, the wiring box structure may be formed of even a greater number of individual telescoping units, as also described in the abovementioned patent. In another construction of a wiring box structure of the above type, the first and second portions are formed as a single integral unit having walls defining openings in the two portions. The opening in the first portion is used to receive an electrical device and the opening in the second portion, which is offset with respect to the opening in the first portion, is covered by a suitable cover or lid which is secured to the walls of the second portion. The cover may be secured to the second portion to cover the opening therein by means of a glue or by providing special posts in the second portion which mate with, and are confined within, corresponding openings provided in the cover, the confining operation being typically accomplished by "heading" the ends of the posts within the openings in the cover. An example of the use of a cover for a box structure is described in U.S. Pat. No. 3,740,451.

BRIEF SUMMARY OF THE INVENTION

The present invention is directed to an electrical wiring box structure which avoids the use of telescoping units or the use of glue or special posts by which a cover may be secured to a wiring box structure to cover an opening in the wiring box structure.

The electrical wiring box structure of the present invention includes a plurality of walls which are arranged to form a first box portion and a second box portion laterally extending from the first box portion and in open communication with the first box portion. The second box portion also has an opening and is offset with respect to the first box portion with the opening therein being offset with respect to the opening of the first box portion. The electrical wiring box structure of the invention further includes a retaining member extending from one of the box portions and adjacent to the opening of the second box portion, and a cover means for the second box portion. The retaining member has a confinement surface spaced from the plane of the opening of the second box portion. The cover means for the second box portion includes a first member covering the opening of the second box portion and having a portion with a thickness approximately equal to the distance between the confinement surface of the retaining member and the plane of the opening of the second box portion, the aforesaid portion of the first member being disposed between the confinement surface of the retaining member and the plane of the opening of the second box portion. The portion of the first member is thereby confined between the confinement surface of the retaining member and the second box portion. The cover means further comprises an attachment means which mechanically and physically secures the first member to one of the walls of the second box portion.

BRIEF DESCRIPTION OF THE DRAWING

Various objects, features and advantages of an electrical wiring box structure in accordance with the present invention will be apparent from the following detailed discussion taken in conjunction with the accompanying drawing in which.

DETAILED DESCRIPTION OF THE INVENTION

Figure 1:
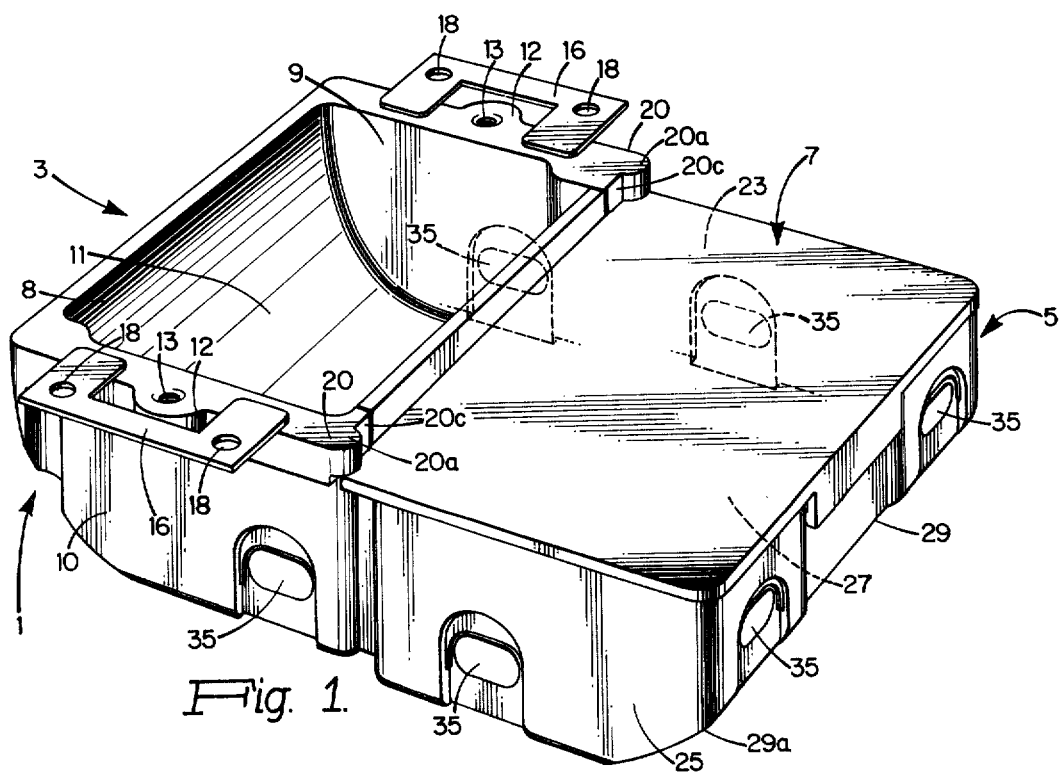
FIG. 1 is a perspective view of an electrical wiring box structure in accordance with the present invention.
Figure 2:
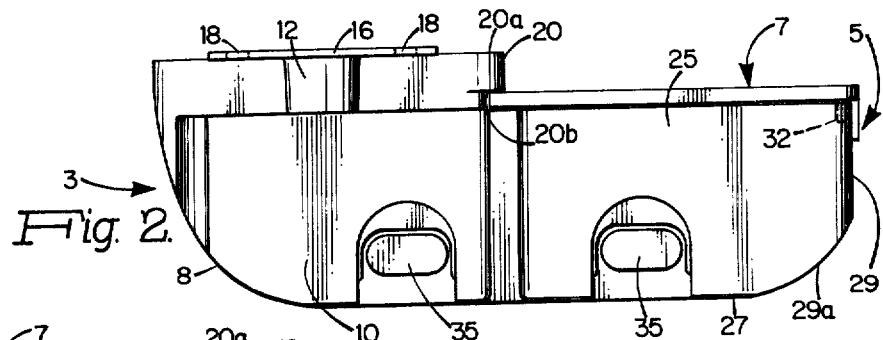
FIG. 2 is a bottom view of the electrical wiring box structure of FIG. 1.
Figure 3:
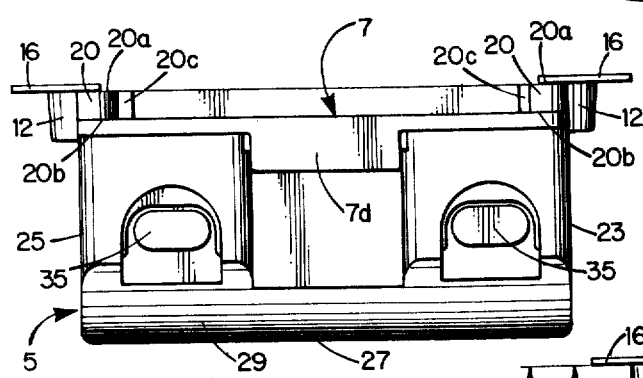
FIG. 3 is an end view of the electrical wiring box structure of FIG. 1.

Referring now to FIG. 1, there is shown in a perspective view an electrical wiring box structure 1 in accordance with the present invention. The electrical wiring box structure 1 generally includes a first, main body portion 3, a second lateral portion 5 extending from the main body portion 3 and in open communication with the main body portion 3, and a cover 7 attached to the second, lateral portion 5. As shown in FIG. 1, the main body portion 3 includes a curved side wall 8, shown more clearly in FIG. 2, a top wall 9, a bottom wall 10, and a rear wall 11. These walls define a volume or space for receiving an electrical device, such as, for example, an electrical switch or outlet. The main body portion 3 also includes a pair of bosses 12 formed integrally with the walls 9 and 10 and each having a threaded opening 13 therein. The main body portion 3 further includes a pair of brackets 16 attached in any desired manner to the walls 9 and 10 and each having a pair of spaced openings 18 therein. The threaded openings 13 in the bosses 12 are used to receive threaded screws for securing an electrical device to the main body portion 3, specifically, to the bosses 12. The openings 18 in the brackets 16 are used to receive nails, screws or other securing means for securing the electrical wiring box structure 1 to a supporting structure, such as, for example, wallboard or panelling.

Figure 4:
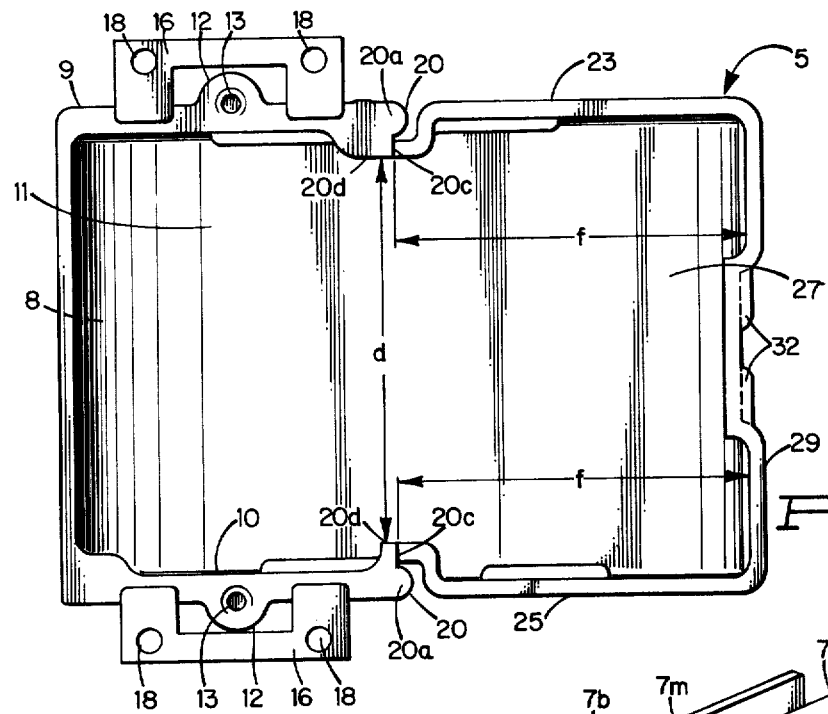

The main body portion 3 of the electrical wiring box structure 1 further has a pair of retaining members, or bosses, 20 formed integrally with the walls 9 and 10 and extending laterally in a direction toward, and slightly overhanging, the lateral portion 5 of the box structure 1, as shown in FIGS. 1 and 4. Each of the bosses 20 has a flat front surface 20a in the same plane as the edge surface of the corresponding wall 9 or 10 and, as shown most clearly in FIGS. 4 and 5, a flat rear surface 20b in a plane parallel to the plane of the front surface 20a, a flat stop surface 20c in a plane normal to the planes of the surfaces 20a and 20b, and a flat stop surface 20d in a plane normal to the planes of the surfaces 20b and 20c. As will be described in detail hereinafter, the bosses 20 are used in the process of attaching the cover 7 to the lateral portion 5 of the box structure 1.

The lateral portion 5 of the box structure 1 is integral with the main body portion 3 and is employed to increase, or add to, the interal space or volume of the main body portion 3. The lateral portion 5 normally receives wires or other parts associated with or used in conjunction with the electrical device received in the main body portion 3 of the box structure 1. The combined internal volumes of the main body portion 3 and the lateral portion 5 of the box structure 1, that is, the overall internal volume of the box structure 1, should be sufficient to comply with code requirements which specify a particular relationship between the space or volume within a box structure and the number and type of electrical connections or wires to be housed therein in order to minimize fire hazards.

As shown most clearly in FIGS. 1 and 4, the lateral portion 5 of the box structure 1 includes a top wall 23, a bottom wall 25, a rear wall 27, and an end wall 29. The end wall 29 further has a slightly curved rear portion 29a, as shown most clearly in FIGS. 1 and 2. This curved portion 29a of the wall 29, together with the curved wall 8 of the main body portion 3, facilitate the insertion of the box structure 1 into a rectangular opening provided in the supporting structure (e.g., wallboard or panelling) to which the box structure 1 is to be attached (via the brackets 16). The walls 23, 25 and 29 have a depth, such as shown at $a$ in FIG. 5, which is less than the depth, shown at $b$ in FIG. 5, of the walls 8, 9 and 10 of the main body portion 3. As a result, the lateral portion 5 and its associated front opening defined by the walls 23, 25 and 29 are offset by an amount $c$, shown in FIG. 5, with respect to the main body portion 3 and its associated front opening as defined by the walls 8, 9 and 10. This offset is necessary since the lateral portion 5 of the box structure 1, together with its associated cover 7, are required to be disposed or positioned behind the supporting structure (e.g., wallboard or panelling) when the box structure 1 is inserted into the rectangular opening provided in the supporting structure. When the box structure is inserted into the opening in the supporting structure, the front opening associated with the main body portion 3 is aligned with the opening provided in the supporting structure and the edge surfaces of the walls 8, 9 and 10 of the main body portion 3 are flush, or coplanar, with the outer surface of the supporting structure.

Figure 5:
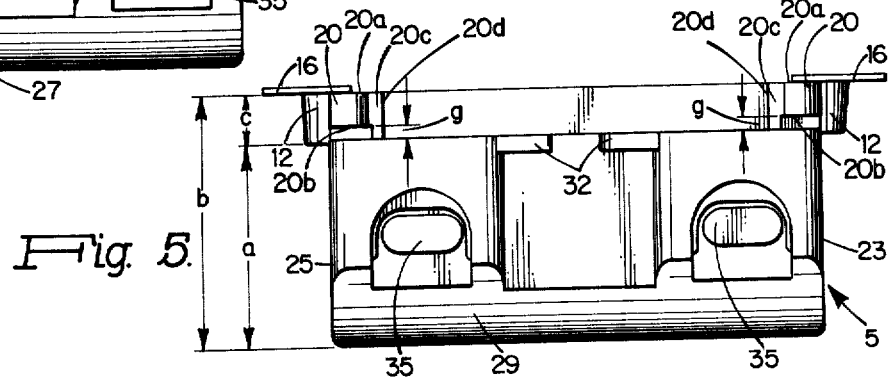
FIGS. 4 and 5 are front and end views, respectively, of the electrical wiring box structure of FIG. 1 with a cover employed thereby being removed.

The end wall 29 of the lateral portion 5 of the box structure 1 further has a pair of spaced, recessed locking tabs 32 integral therewith in a central region of the end wall 29, as shown most clearly in FIGS. 4 and 5, these tabs being located adjacent to the exposed edge surface of the end wall 29. As will now be described in detail, these locking tabs 32 are used, together with the aforedescribed bosses 20, in the process of attaching the cover 7 to the lateral portion 5 of the box structure 1.

Figure 6:
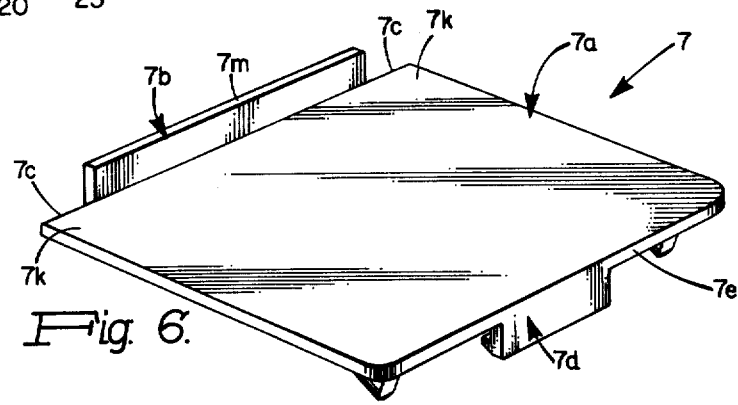
FIG. 6 is a perspective view of the cover employed by the electrical wiring box structure of FIG. 1.
Figure 7:
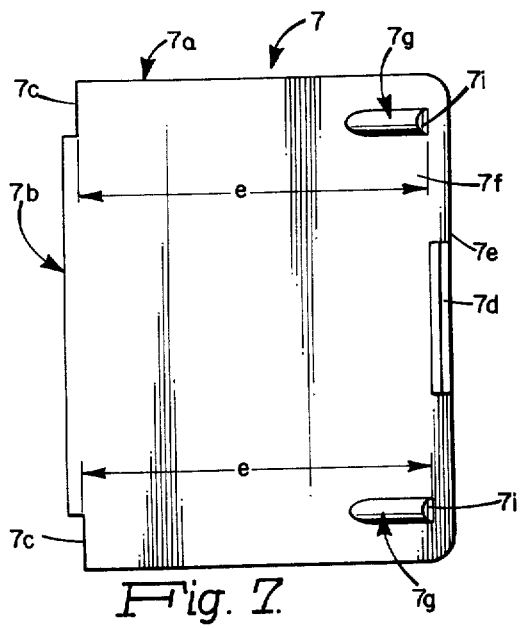
FIGS. 7, 8 and 9 are rear, end and bottom views, respectively, of the cover of FIG. 6.
Figure 8:
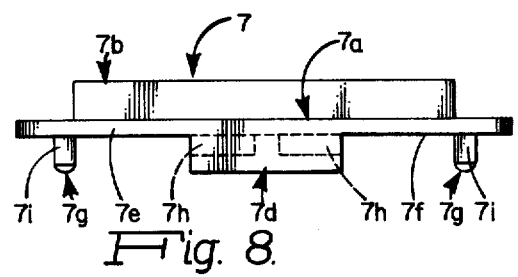
Figure 9:
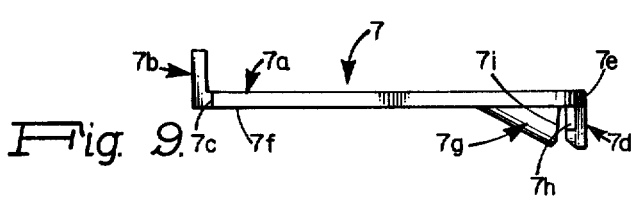

The cover 7, as employed in the present invention, is shown in detail in FIGS. 6–9. As shown in these figures, the cover 7 has a flat portion or member 7a; a portion 7b adjacent to a pair of edge surfaces 7c of the flat portion 7a and extending away normally from the flat portion 7a in a first direction, as best shown in FIGS. 8 and 9; a latch member 7d adjacent to a second edge surface 7e of the flat portion 7a and extending away normally from a rear surface 7f of the flat portion 7a in a second direction, as best shown in FIGS. 7–9; and a pair of spaced bosses or protrusions 7g on the rear surface 7f of the flat portion 7a. The portion 7b of the cover 7 further has a length equal to the distance between the stop surfaces 20d of the bosses 20 of the main body portion 3, shown at $d$ in FIG. 4, and, as will be apparent hereinafter, bridges the distance between the stop surfaces 20d of these bosses when the cover 7 is attached to the lateral portion 5 of the box structure 1. The latch member 7d further has a pair of notches 7h formed therein, as best shown in FIGS. 8 and 9, which are arranged when the cover 7 is attached to the lateral portion 5 to engage the aforementioned recessed locking tabs 32 provided in the wall 29. The protrusions 7g each further have a slightly inclined end surface 7i (FIG. 7) which is spaced from the plane of the edge surfaces 7c of the cover 7 by a distance $e$, shown in FIG. 7, which is slightly greater than the distance $f$, shown in FIG. 4, between the flat surface 20c of a boss 20 and the inner surface of the wall 29. As will be apparent hereinafter, the value of the dimension $e$ enables a tight fit to be established between the cover 7 and the lateral portion 5. The thickness of the flat portion or member 7a of the cover 7 is made to be approximately equal to the distance between the lower surfaces 20b of the bosses 20 and the exposed edge surfaces of the walls 23, 25 and 29 of the lateral portion 5, this distance being shown at $g$ in FIG. 5.

To attach the cover 7 to the lateral portion 5 of the box structure 1 to cover the opening of the lateral portion 5, the corner regions of the cover 7 adjacent to the portion 7b of the cover 7, shown at 7k in FIG. 6, are placed under the bosses 20 so that the edge surfaces 7c at these corner regions abut against the stop surfaces 20c of the bosses 20, and the portion 7b of the cover 7 is positioned between the stop surfaces 20d of the bosses 20 so that it bridges the distance between the stop surfaces 20d of the bosses 20. Following this operation, the front edge surface of the portion 7b, shown at 7m in FIG. 6, is nearly co-planar with the edge surfaces of the walls 8–10 of the main body portion 3. Pressure is then applied against the cover 7, for example, at the opposite corner regions thereof, causing the end surfaces 7i of the protrusions 7g to contact and slide along the inner surface of the end wall 29. This pressure is continued until the inner surface 7f of the cover 7 mates with the edge surfaces of the walls 23, 25 and 29 and the notches 7h in the latch member 7d latch or engage with the locking tabs 32 provided on the outer surface of the wall 29. At this time, the mechanical attachment of the cover 7 to the lateral portion 5 is complete. It will be noted that when the cover 7 has been attached to the lateral portion 5 as described above, the corner regions 7k of the cover 7 are retained or held captive between the rear surfaces 20c of the bosses 20 and the edge surfaces of the walls 23 and 25, by virtue of the thickness of the flat portion 7a being approximately equal to the distance g (FIG. 5) between the rear surfaces 20c of the bosses 20 and the edge surfaces of the walls 23 and 25. In addition, the cover 7 is prevented from any lateral movement toward the end wall 29 by virtue of the tight mechanical and physical fit established between the cover 7 and the end wall 29 of the lateral portion 5 by virtue of the use of the protrusions 7g and the particular values selected for the dimensions e (FIG. 7) and f (FIG. 4). Further, the latching or engagement of the latch member 7d with the locking tabs 32 further adds to the mechanical fit established between the cover 7 and the end wall 29 and insures that the cover 7 will not inadvertently become disengaged from the lateral portion 5 by providing an additional locking effect.

Once the assembly of the wiring box structure 1 is complete, any desired electrical connections to an electrical device to be used with the box structure 1 may then be made. In the case of mobile home and modular constructions, these electrical connections are usually made after the box structure has been inserted into an opening in a supporting structure. To accomplish the desired electrical connections, a plurality of knock out elements or plugs 35 are provided in the walls 9, 10, 23, 25 and 29 of the box structure 1, one or more of the knock out elements 35 being removed, or knocked out, by the use of a suitable tool to gain access to the interior of the box structure 1 for making the desired electrical connections.

The box structure 1, as described hereinabove, may be constructed from materials well known to those skilled in the art. By way of example, the box structure may, with the exception of the brackets 16, be formed of a thermosetting phenolic resin material having insulating properties, using conventional injection molding techniques. The brackets 16 in this case would normally be made of metal. It is also contemplated that a box structure having the particular features as described above may be constructed from a thermoplastic material in which case the brackets may also be of a thermoplastic material. The features of the invention may also be incorporated in an all-metal box structure.

Although the cover 7 has been described hereinabove to have a particular construction and form, it will be obvious that various modifications may be made therein by those skilled in the art. For example, the cover 7 could be constructed to have only one protrusion 7g for achieving a satisfactory and reasonably tight mechanical and physical fit between the cover 7 and the end wall 29 of the lateral portion 5. Alternatively, the cover 7 could be constructed to have one or more of the protrusions 7g mating with the inner surfaces of the top and bottom walls 23 and 25, respectively, instead of with the end wall 29 (for example, by turning the protrusions 7g through an angle of 90°). Further, in some cases, the latch member 7d and the associated locking tabs 32 may not be necessary. In addition to the above possible modifications, it may be possible in some designs of the box structure 1 to include only one boss 22 for confining one corner region of the cover 7 when the cover 7 has been secured to the end wall 20 of the lateral portion 5. It is also possible to provide one or more bosses, such as the bosses 20, integral with one of the walls 23 and 25 (instead of with the walls 9 and 10) and to provide a latch member to engage with associated locking tabs provided on the outer surface of the other one of the walls 23 and 25. Other changes and modifications will be apparent to those skilled in the art without departing from the invention as called for in the appended claims.

What is claimed is:

1. An electrical wiring box structure comprising:
   a plurality of walls arranged to form a first box portion having an opening and a second box portion laterally extending from the first box portion and in open communication with the first box portion and having an opening, the second box portion being offset with respect to the first box portion and the opening of the second box portion being offset with respect to the opening of the first box portion;
   a retaining member extending from one of the box portions and adjacent to the opening of the second box portion, said retaining member having a confinement surface spaced from the plane of the opening of the second box portion; and
   cover means for the second box portion, said cover means comprising:
      a first member covering the opening of the second box portion and having a portion with a thickness approximately equal to the distance between the confinement surface of the retaining member and the plane of the opening of the second box portion and disposed between the confinement surface of the retaining member and the plane of the opening of the second box portion, said portion of the first member thereby being confined between the confinement surface of the retaining member and the second box portion; and
      attachment means mechanically and physically securing the first member to one of the walls of the second box portion.

2. An electrical wiring box structure in accordance with claim 1 wherein:
   the said one of the walls of the second box portion to which the first member of the cover means is secured has an inner surface adjacent to the opening of the second box portion;
   the first member of the cover means has an inner surface over the opening of the second box portion; and
   the attachment means of the cover means includes a protrusion extending from the inner surface of the first member into the opening of the second box portion and having a surface abutting against the inner surface of the said one of the walls of the second box portion, said protrusion thereby preventing lateral movement of the first member in a direction toward the said one of the walls of the second box portion.

3. An electrical wiring box structure in accordance with claim 2 wherein:
   the said one of the walls of the second box portion has an outer surface; and
   the attachment means further comprises:
      a locking tab extending from the outer surface of the said one of the walls of the second box portion; and
      a latch member extending from the first member of the cover means and having a notch therein in engagement with the locking tab.

4. An electrical wiring box structure in accordance with claim 3 wherein:
   the retaining member further has a stop surface adjacent to and at an angle to the confinement surface; and
   the first member of the cover means further has a surface abutting against the stop surface of the retaining member when the aforesaid portion of the first member is disposed between the confinement surface of the retaining member and the plane of the opening of the second box portion.

5. An electrical wiring box structure in accordance with claim 4 wherein:
   the retaining member is a boss member extending from the first box portion, the confinement surface thereof being above the plane of the opening of the second box portion and the stop surface thereof extending between the plane of the opening of the second box portion and the confinement surface of the boss member.

6. An electrical wiring box structure comprising:
   a first box portion including a top wall, bottom wall, rear wall, and side wall, the top, bottom and side walls having edge surfaces and defining a first opening in a first plane;
   a second box portion laterally extending from the first box portion and in open communication with the first box portion, said second box portion being offset with respect to the first box portion and including top wall, bottom wall, rear wall, and a side wall, the top, bottom and side walls having edge surfaces and defining a second opening in a second plane, said second opening being in a plane parallel to and offset with respect to the plane of the first opening of the first box portion;
   a retaining member extending from one of the box portions and adjacent to the second opening of the second box portion, said retaining member having a first surface spaced from the edge surfaces of the top, bottom and side walls of the second box portion and an adjacent stop surface at an angle to the first surface; and
   cover means for the second box portion, said cover means comprising:
      a first member disposed on the edge surfaces of the top, bottom and side walls of the second box portion and covering the second opening of the second box portion, said first member having a portion thereof in physical contact with both the first surface of the retaining member and with the edge surfaces of the top, bottom and side walls of the second body portion, said portion further having an edge surface abutting against the top surface of the retaining member, whereby said portion is retained in the space between the first surface of the retaining member and the edge surfaces of the top, bottom and side walls of the second box portion; and
      attachment means mechanically and physically securing the first member to one of the walls of the second box portion.

7. An electrical wiring box structure in accordance with claim 6 wherein:
   the said one of the walls of the second box portion to which the first member of the cover means is secured has an inner surface adjacent to the second opening of the second box portion;
   the first member of the cover means has an inner surface abutting against the edge surfaces of the top, bottom and side walls of the second box portion; and
   the attachment means of the cover means includes a protrusion extending from the inner surface of the first member into the second opening of the second box portion and having a surface abutting against the inner surface of the said one of the walls of the second box portion, said protrusion thereby preventing lateral movement of the first member in a direction toward the said one of the walls of the second box portion.

8. An electrical wiring box structure in accordance with claim 7 wherein:
   the said one of the walls of the second box portion has an outer surface; and
   the attachment means further comprises:
      a locking tab extending from the outer surface of the said one of the walls of the second box portion; and
      a latch member extending from the first member of the cover means and having a notch therein in engagement with the locking tab.

9. An electrical wiring box structure in accordance with claim 8 wherein:
   the retaining member is a boss member extending from the top wall of the first box portion in a direction toward the second opening of the second box portion, the first surface thereof being above the plane of the second opening of the second box portion and the stop surface thereof extending between the plane of the second opening of the second box portion and the first surface of the boss member.

10. An electrical wiring box structure comprising:
   a first box portion including a top wall, bottom wall, rear wall, and side wall, the top, bottom and side walls having edge surfaces in a common plane and defining a first opening in a first plane;
   a second box portion laterally extending from the first box portion and in open communication with the first box portion, said second box portion being offset with respect to the first box portion and including a top wall aligned with the top wall of the first box portion, a bottom wall aligned with the bottom wall of the first box portion, a rear wall aligned with the rear wall of the first box portion, and a side wall opposing the side wall of the first box portion, the top, bottom and side walls of the second box portion having edge surfaces in a common plane and defining a second opening in a second plane, said second opening being in a plane parallel to and offset with respect to the plane of the first opening of the first box portion;

first and second boss members extending respectively from the top and bottom walls of the first box portion and adjacent to the second opening of the second box portion, each of the boss members having a first surface spaced from the edge surfaces of the top, bottom and side walls of the second box portion and an adjacent stop surface at an angle to the first surface; and cover means for the second box portion, said cover means comprising:

a first member disposed on the edge surfaces of the top, bottom and side walls of the second box portion and covering the second opening of the second box portion, said first member having first and second portion thereof in physical contact with the first surfaces of the first and second boss members, respectively, and in physical contact with the edge surfaces of the top, bottom and side walls of the second box portion, said first and second portions further having first and second edge surfaces abutting against the stop surfaces of the first and second boss members, respectively, whereby said first and second portions are retained in the spaces between the first surfaces of the boss members and the edge surfaces of the top, bottom and side walls of the second box portion; and attachment means mechanically and physically securing the first member to the side wall of the second box portion.

11. An electrical wiring box structure in accordance with claim 10 wherein:

the side wall of the second box portion has an inner surface adjacent to the second opening of the second box portion and further has an outer surface;

the first member of the cover means has an inner surface abutting against the edge surfaces of the top, bottom and side walls of the second box portion;

and wherein:

the attachment means includes:

first and second protrusions extending from the inner surface of the first member into the second opening of the second box portion and each having a surface abutting against the inner surface of the side wall of the second box portion, said protrusions thereby preventing lateral movement of the first member in a direction toward the side wall of the second box portion;

a pair of spaced locking tabs extending from the outer surface of the side wall of the second box portion; and a latch member extending from the first member of the cover means and having spaced notches therein in engagement with the locking tabs.

12. An electrical wiring box structure in accordance with claim 11 wherein:

each of the boss members has a second stop surface at an angle to the associated first stop surface and at an angle to the first surface; and the first member of the cover means further has a third portion extending between the second stop surfaces of the boss members and having edge surfaces abutting against the second stop surfaces of the boss members.

13. An electrical wiring box and cover assembly comprising:

an electrical wiring box structure including a wall assembly defining an opening therein, said wall assembly including a portion adjacent to the opening;

said electrical wiring box structure further including a retaining member adjacent to the opening therein, said retaining member having a confinement surface spaced above the plane of the opening; and cover means for the opening of the electrical wiring box structure, said cover means comprising:

a first member covering the opening of the electrical wiring box structure and having a portion with a thickness approximately equal to the distance between the confinement surface of the retaining member and the plane of the opening of the electrical wiring box structure and disposed between the confinement surface of the retaining member and the plane of the opening of the electrical wiring box structure; and attachment means mechanically and physically securing the first member to the portion of the wall assembly adjacent to the opening of the electrical wiring box structure.

14. An electrical wiring box structure in accordance with claim 13 wherein:

the portion of the wall assembly has a surface at the opening of the electrical wiring box structure;

the first member of the cover means has an inner surface over the opening of the electrical wiring box structure; and the attachment means of the cover means includes a protrusion extending from the inner surface of the first member into the opening of the electrical wiring box structure and having a surface abutting against the surface of the aforesaid portion of the wall assembly adjacent to opening of the electrical wiring box structure.

15. An electrical wiring box structure in accordance with claim 14 wherein:

the retaining member further has a stop surface adjacent to and at an angle to the confinement surface; and the first member of the cover means further has a surface abutting against the stop surface of the retaining member when the aforesaid portion of the first member is disposed between the confinement surface of the retaining member and the plane of the opening of the electrical wiring box structure.

16. An electrical wiring box structure in accordance with claim 15 wherein:

the portion of the wall assembly adjacent to the opening of the electrical wiring box structure has an outer surface; and the attachment means further comprises:

a locking tab extending from the outer surface of the aforesaid portion of the wall assembly; and a latch member extending from the first member of the cover means and having a notch therein in engagement with the locking tab.

* * * * *